(12) United States Patent
Choi et al.

(10) Patent No.: US 11,183,056 B2
(45) Date of Patent: Nov. 23, 2021

(54) ELECTRONIC DEVICE FOR GENERATING MAP DATA AND OPERATING METHOD THEREFOR

(71) Applicant: Samsung Electronics Co., Ltd., Suwon-si (KR)

(72) Inventors: Mid-eum Choi, Seoul (KR); A-ron Baik, Seongnam-si (KR); Chang-soo Park, Yongin-si (KR); Jeong-eun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/492,404

(22) PCT Filed: Feb. 5, 2018

(86) PCT No.: PCT/KR2018/001488
§ 371 (c)(1),
(2) Date: Sep. 9, 2019

(87) PCT Pub. No.: WO2018/164377
PCT Pub. Date: Sep. 13, 2018

(65) Prior Publication Data
US 2021/0142667 A1    May 13, 2021

(30) Foreign Application Priority Data

Mar. 7, 2017    (KR) .......................... 10-2017-0029057

(51) Int. Cl.
*G08G 1/0969*    (2006.01)

(52) U.S. Cl.
CPC .................................. *G08G 1/0969* (2013.01)

(58) Field of Classification Search
CPC ..................................................... G08G 1/0969
See application file for complete search history.

(56) References Cited

U.S. PATENT DOCUMENTS 6,732,826 B2    5/2004    Song et al.
7,774,158 B2    8/2010    Domingues Goncalves et al.
(Continued)

FOREIGN PATENT DOCUMENTS

CN    1381340 A    11/2002
CN    101514904 A    8/2009
(Continued)

OTHER PUBLICATIONS

European Search Report dated Jan. 3, 2020, issued in the European Patent Application No. 18764807.6.
(Continued)

*Primary Examiner* — Hongmin Fan
(74) *Attorney, Agent, or Firm* — Jefferson IP Law, LLP

(57) ABSTRACT

An electronic device and a method are provided. The electronic device includes: at least one sensing unit configured to acquire position data and image data for each of a plurality of nodes at predetermined intervals while the electronic device is moving; and a processor configured to extract an object from the image data, generate first object data for identifying the extracted object, and store position data of a first node corresponding to the image data from which the object has been extracted and the first object data corresponding to the first node.

18 Claims, 14 Drawing Sheets

(56) References Cited

U.S. PATENT DOCUMENTS

| | | | |
|---|---|---|---|
| 8,185,306 | B2 | 5/2012 | Adachi |
| 8,537,162 | B2 | 9/2013 | Nomura |
| 8,744,744 | B2 | 6/2014 | Takagi |
| 8,958,980 | B2 | 2/2015 | Miksa et al. |
| 9,360,328 | B2 | 6/2016 | You et al. |
| 9,384,402 | B1 | 7/2016 | Furman et al. |
| 2004/0181335 | A1 | 9/2004 | Kim et al. |
| 2008/0033633 | A1 | 2/2008 | Akiyoshi et al. |
| 2013/0211656 | A1 | 8/2013 | An et al. |
| 2015/0074583 | A1 | 3/2015 | Wang et al. |
| 2016/0061612 | A1 | 3/2016 | You et al. |
| 2017/0041751 | A1 | 2/2017 | Hong et al. |
| 2017/0236024 | A1* | 8/2017 | Wang .................. G06K 9/4652 382/201 |

FOREIGN PATENT DOCUMENTS

| | | |
|---|---|---|
| CN | 101825471 A | 9/2010 |
| CN | 104280036 A | 1/2015 |
| CN | 105759295 A | 7/2016 |
| EP | 2 242 994 A1 | 10/2010 |
| JP | 2008-003253 A | 1/2008 |
| JP | 2012-048642 A | 3/2012 |
| JP | 2016-048210 A | 4/2016 |
| KR | 10-2004-0073805 A | 8/2004 |
| KR | 10-0938194 B1 | 1/2010 |
| KR | 10-2013-0091907 A | 8/2013 |
| KR | 10-1610502 B1 | 4/2016 |

OTHER PUBLICATIONS

Using MySQL and PHP with Google Maps https://developers.google.com/maps/articles/phpsqlajax_v3.

WaypointType https://developer.here.com/rest-apis/documentation/routing/topics/resource-type-waypoint.html.

International Search Report dated May 21, 2018, issued in the International Application No. PCT/KR2018/001488.

Chinese Office Action dated Dec. 3, 2020, issued in Chinese Application No. 201880016696.3.

Liu; Simultaneous Localization and Mapping Based on Multiple Sensors; Harbin Institute of Technology; Mar. 31, 2016.

Duan; Outdoor Simultaneous Location and Mapping for Unmanned Ground Vehicles with Binocular Camera; Dalian University of Technology; Mar. 31, 2016.

Jin et al.; Robust Localization via Turning Point Filtering with Road Map; 2016 IEEE Intelligent Vehicles Symposium (IV); Jun. 19-22, 2016; Gothenburg, Sweden.

Korean Office Action with English translation dated Sep. 9, 2021; Korean Appln No. 10-2017-0029057.

Chinese Office Action with English translation dated Jul. 14, 2021; Chinese Appln. No. 201880016696.3.

\* cited by examiner

ELECTRONIC DEVICE FOR GENERATING MAP DATA AND OPERATING METHOD THEREFOR

TECHNICAL FIELD

The present disclosure relates to an electronic device for generating map data and an operating method of the same.

BACKGROUND ART

Along with the merge of information communication technology and the vehicle industry, smartification of vehicles has been quickly progressing. According to the smartification, vehicles have evolved from simple mechanical devices to smart cars, and particularly, autonomous driving has received attention as a core technique of a smart car.

Autonomous driving indicates a technique of autonomously arriving at a destination without a driver's operation on a wheel, an acceleration pedal, a brake, or the like.

Recently, various additional functions related to autonomous driving have been continuously developed, and research into a method capable of providing a safe autonomous driving experience to a passenger by controlling a vehicle through recognition and determination of a driving environment using various kinds of data has been demanded.

DESCRIPTION OF EMBODIMENTS

Technical Problem

Provided is an electronic device and a method of generating map data. Provided is a computer-readable recording medium having recorded thereon a program for executing, on a computer, the method. Technical problems to be solved are not limited to the technical problems described above, and other technical problems may exist.

Solution to Problem

According to an aspect of the present disclosure, an electronic device includes: at least one sensing unit configured to acquire position data and image data for each of a plurality of nodes at predetermined intervals while the electronic device is moving; and a processor configured to extract an object from the image data, generate first object data for identifying the extracted object, and store position data of a first node corresponding to the image data from which the object has been extracted and the first object data corresponding to the first node.

BEST MODE

According to an aspect of the present disclosure, an electronic device includes: at least one sensing unit configured to acquire position data and image data for each of a plurality of nodes at predetermined intervals while the electronic device is moving; and a processor configured to extract an object from the image data, generate first object data for identifying the extracted object, and store position data of a first node corresponding to the image data from which the object has been extracted and the first object data corresponding to the first node.

According to another aspect of the present disclosure, an operating method of an electronic device includes: acquiring position data and image data for each of a plurality of nodes at predetermined intervals while the electronic device is moving; extracting an object from the image data; generating first object data for identifying the extracted object; and storing position data of a first node corresponding to the image data from which the object has been extracted and the first object data corresponding to the first node.

According to another aspect of the present disclosure, a computer-readable recording medium includes a recording medium having recorded thereon a program for executing, on a computer, the method.

MODE OF DISCLOSURE

The terms used in embodiments are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

Throughout the specification, it will also be understood that when a component "includes" an element, unless there is another opposite description thereto, it should be understood that the component does not exclude another element but may further include another element. In addition, terms such as " . . . unit", " . . . module", and the like refer to units that perform at least one function or operation, and the units may be implemented as hardware or software or as a combination of hardware and software.

Hereinafter, embodiments of the present invention will be described in detail with reference to the accompanying drawings so that those of ordinary skill in the art may easily realize the present invention. However, the present invention may be embodied in many different forms and should not be construed as being limited to the embodiments set forth herein.

Hereinafter, embodiments of the present invention will be described in detail with reference to the accompanying drawings.

In the present specification, a vehicle 1 may include an electronic device 100 for assisting or controlling driving of the vehicle 1 (hereinafter, the electronic device 100).

Figure 1:
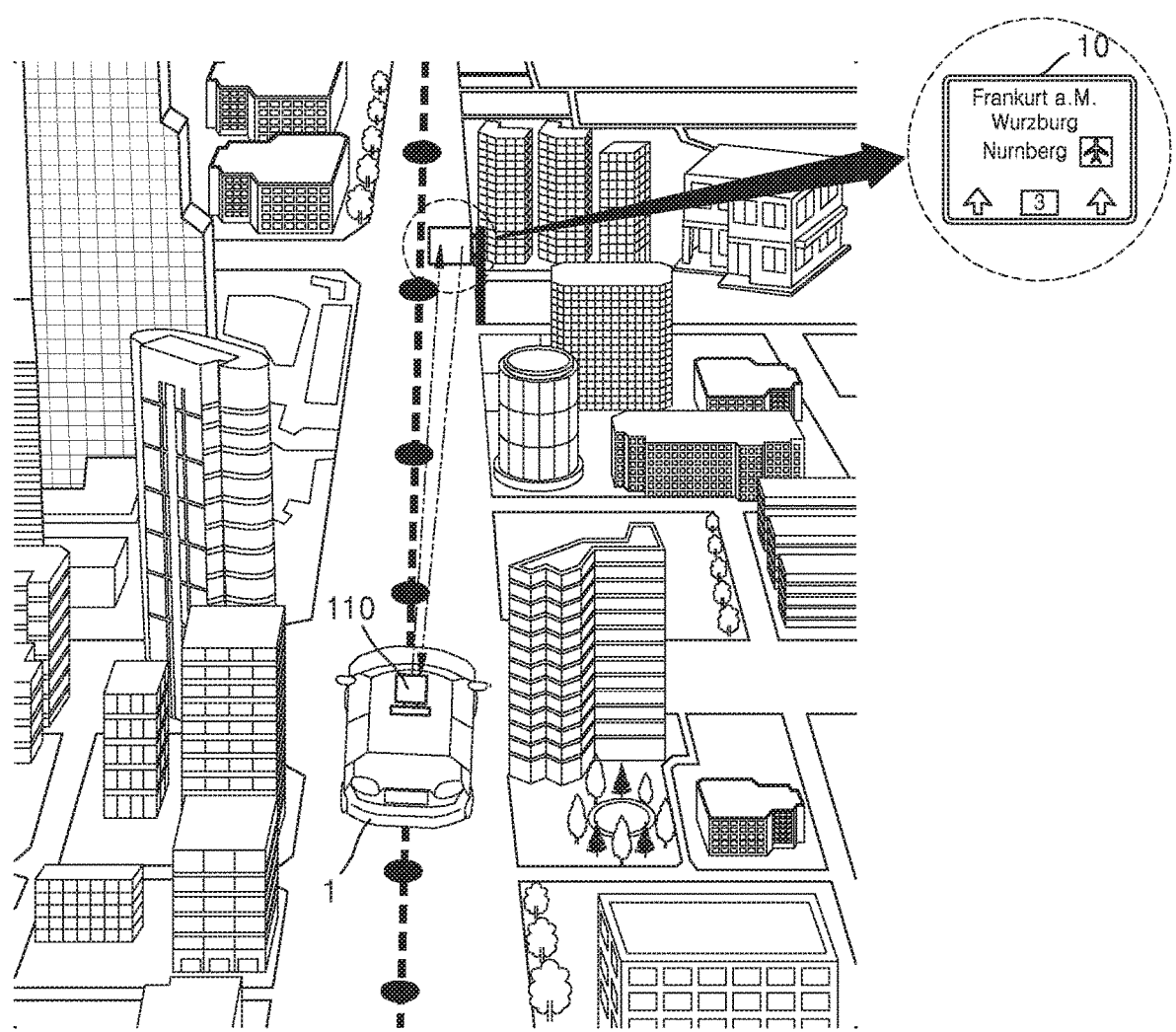
FIG. 1 is a diagram for describing an operating example of an electronic device, according to an embodiment.

FIG. 1 is a diagram for describing an operating example of an electronic device, according to an embodiment.

Referring to FIG. 1, the electronic device 100 included in the vehicle 1 may recognize a surrounding environment through a sensing unit 110 while the vehicle 1 is traveling on a road and more precisely update map data by using an object (e.g., a signpost) 10 detected from the surroundings. According to an embodiment, the electronic device 100 may generate object data including a distance from the vehicle 1 to the object (e.g., a signpost) 10, a figure and a size (e.g., a size of 150 cm×100 cm, rectangular flat plate) of the object 10, and the like and more easily and efficiently update the map data by using the object data.

According to an embodiment, object data may be data for identifying an object.

For example, the object data may include a figure, a size, a shape, a color, a material, a curvature, an area, a volume, and the like of the object. In addition, the object data may include a text, a pattern, a logo, and the like extracted from the object. In addition, the object data may include a distance from a position of the electronic device 100, which has sensed the object, to the object, a position (e.g., coordinate information of three depths of field (3DoF: x, y, and yaw angle) or 6DoF (x, y, z, roll angle, pitch angle, and yaw angle) of the object, and a direction of the object. In addition, the object data may include flatness and reflectivity of the object. However, the object data is not limited thereto.

According to an embodiment, the electronic device 100 may store object data instead of all images of the surroundings, which have been acquired while driving, for map update, to minimize a storage capacity and may minimize a computation amount in map update to reduce a load of a processor.

An autonomous vehicle may generate and update map data of a surrounding environment by using various pieces of sensor information while traveling on a road and localize a current position of the vehicle on the map data. In this case, the vehicle may estimate a more accurate position of the vehicle on map data as the vehicle has more precise map data.

According to an embodiment, the electronic device 100 may more accurately estimate a current position of the vehicle (1) on map data by updating more precise map data using data related to the object 10, which has been detected from the surroundings while the vehicle 1 has been traveling.

In addition, FIG. 1 shows the electronic device 100 included in the vehicle 1, but the electronic device 100 is not limited thereto. According to an embodiment, a mobile device or robot (not shown) may include the electronic device 100. This will be described in detail below with reference to FIGS. 11 and 12.

Figure 2:
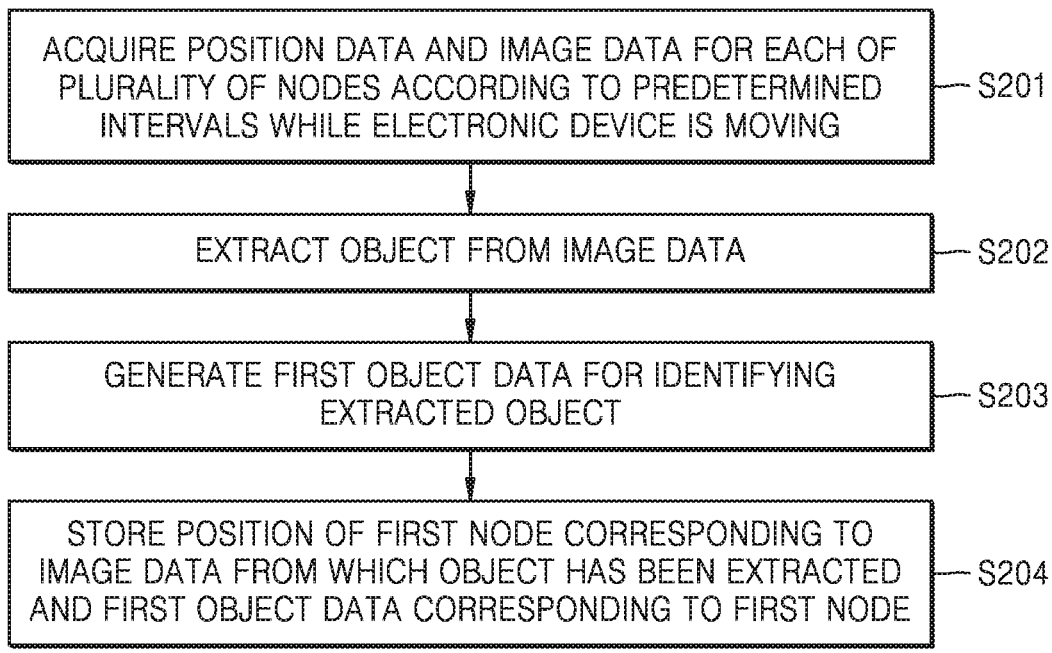
FIG. 2 is a flowchart of an operating example of the electronic device, according to an embodiment.

FIG. 2 is a flowchart of an operating example of an electronic device, according to an embodiment.

In operation S201, the electronic device 100 may acquire position data and image data for each of a plurality of nodes according to predetermined intervals while the electronic device 100 is moving. According to an embodiment, the electronic device 100 may determine a plurality of nodes according to time intervals or distance intervals.

Figure 13:
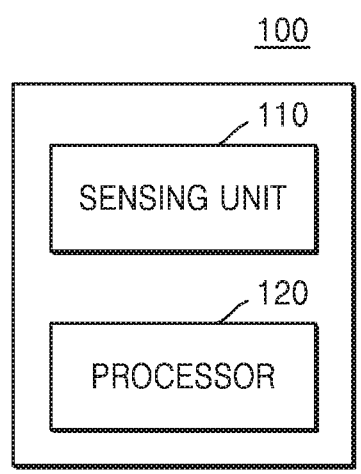
FIG. 13 is a block diagram of an electronic device according to an embodiment.

According to an embodiment, a node may indicate a position of a vehicle (1 of FIG. 1) at a time point where data is acquired by a sensing unit (110 of FIG. 13).

According to an embodiment, when the vehicle (1 of FIG. 1) including the electronic device 100 moves, a position of the vehicle (1 of FIG. 1) may be measured for each node according to a predetermined time interval (e.g., one second). For example, assuming that a position of the electronic device 100 at a time point t is a node A, a position of the electronic device 100 at a time point t+1 may be described as a node B adjacent to the node A. A path along which the vehicle (1 of FIG. 1) including the electronic device 100 has traveled may be a set of consecutive nodes.

In addition, according to an embodiment, when the vehicle (1 of FIG. 1) including the electronic device 100 moves, the electronic device 100 may acquire position data and image data of the vehicle (1 of FIG. 1) at every node according to a predetermined distance interval (e.g., 1 m).

According to an embodiment, the electronic device 100 may acquire position data of each node through the sensing unit 110 including an odometry sensor 230, an acceleration sensor 231, an inertial measurement unit (IMU) 225, a global positioning system (GPS) 224, and the like.

According to an embodiment, position data of a node may include a position coordinate value of the node. According to an embodiment, position data may be acquired as 3DoF or 6DoF but is not limited thereto. For example, position data of the node A may be acquired as (1 m, 2 m, and 3°), and position data of the node B may be acquired as (2 m, 2 m, and 3.1°).

In addition, according to an embodiment, the electronic device 100 may acquire image data for each node through the sensing unit including a light detection and ranging (LIDAR) sensor 227, an image sensor 228, and the like.

According to an embodiment, the image data acquired for each node may include a three-dimensional (3D) point cloud, an image, and the like.

According to an embodiment, the electronic device 100 may recognize a surrounding environment of the electronic device 100 through the sensing unit 110. The sensing unit 110 may include the LIDAR sensor 227. The LIDAR sensor 227 may recognize a shape of a surrounding object of the moving electronic device 100, a relative distance to the surrounding object, surrounding terrain, and the like. For example, the LIDAR sensor 227 may acquire a signpost around the vehicle (1 of FIG. 1), a road shape, a distance to a vehicle ahead, and the like.

Particularly, the LIDAR sensor 227 may output a laser beam to acquire information on a shape of an object. The LIDAR sensor 227 may include a single laser output device or a plurality of laser output devices. The single laser output device is rotatable around a vertical axis (z-axis), has an adjustable horizontal angle on an xy-plane and an adjustable vertical angle between the xy-plane and the z-axis, and also has an adjustable tilt. Each of the plurality of laser output devices may be the same as the single laser output device. The plurality of laser output devices are also independently adjustable at rotation, angle, and tilt.

The LIDAR sensor 227 may output laser beam(s) by using the laser output device(s) and acquire a reflected signal from an object through at least one laser receiver.

According to an embodiment, the reflected signal may include an ultrasonic wave, an infrared ray, a visible light beam, or a laser beam reflected from the object but is not limited thereto.

In operation S202, the electronic device 100 may extract an object from the image data.

According to an embodiment, the object to be extracted by the electronic device 100 may be a matter having the least possibility of a change in a position, a figure, a size, and the like along with time among matters which can be observed around the moving electronic device 100. For example, the object may be a signpost, a sign board, a road surface mark, a traffic light, a pole, an iron tower, a monument, a bridge, a curb, a guardrail, a building, a lane, or the like but is not limited thereto.

According to an embodiment, the electronic device 100 may determine or change a signpost on a road as an object to be used for a map update. In addition, information on the object may be preset in the electronic device 100.

In operation S203, the electronic device 100 may generate first object data for identifying the extracted object.

According to an embodiment, object data may include a figure, a size, a shape, a color, and a material of an object, a distance from a position of the electronic device 100, which has sensed the object, to the object, and the like but is not limited thereto.

For example, a processor 120 of the electronic device 100 may determine a figure, a size, and the like by using sensor information acquired through the sensing unit 110. In addition, the processor 120 of the electronic device 100 may determine a relative distance, a relative angle, and the like between the vehicle (1 of FIG. 1) and the object at a time point wherein the object is extracted, by using the sensor information acquired through the sensing unit 110.

In operation S204, the electronic device 100 may store position data of a first node corresponding to the image data from which the object has been extracted and the first object data corresponding to the first node.

According to an embodiment, the first node may be described as a position of the vehicle (1 of FIG. 1) including the electronic device 100 at a time point where a specific object is detected. For example, assuming that a position of the vehicle (1 of FIG. 1) at a time point wherein an object (e.g., a signpost A) is detected is the first node, the electronic device 100 may store position data of the first node and the first object data including a figure and a shape of an object detected at the first node, distance data to the object, and the like in a storage unit 140 by matching the position data of the first node to the first object data.

According to an embodiment, the electronic device 100 may detect the same object again when traveling the same path repetitively. When the electronic device 100 repetitively detects the same object at different time points, the electronic device 100 may compare already stored data of the object with currently generated data of the object. The electronic device 100 may calculate more accurate position data of a node by using pre-stored object data.

For example, when the same object is observed at the node A and the node B, a relative position between the node A and the node B may be calculated by using a relative position between the node A and the object and a relative position between the node B and the object.

According to an embodiment, the electronic device 100 may correct position data of a node by using an object and further update map data based on the corrected position data of the node. An embodiment related to this will be described below in detail with reference to FIGS. 6 to 8.

Figure 3:
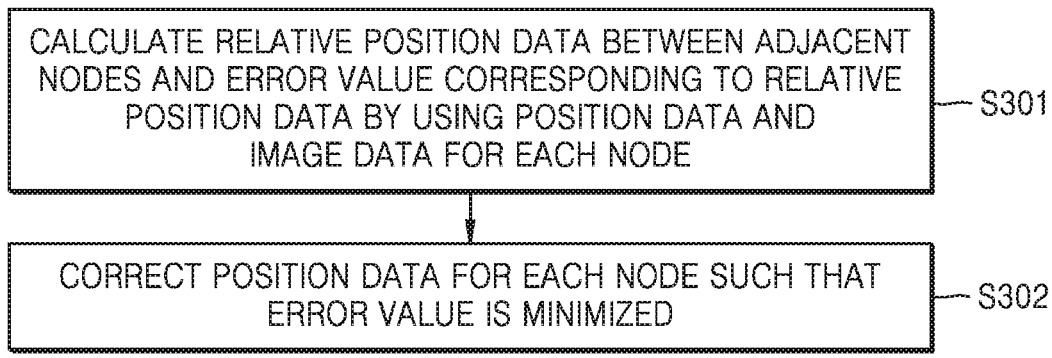
FIG. 3 is a flowchart of an example of generating an edge between nodes, according to an embodiment.
Figure 4:
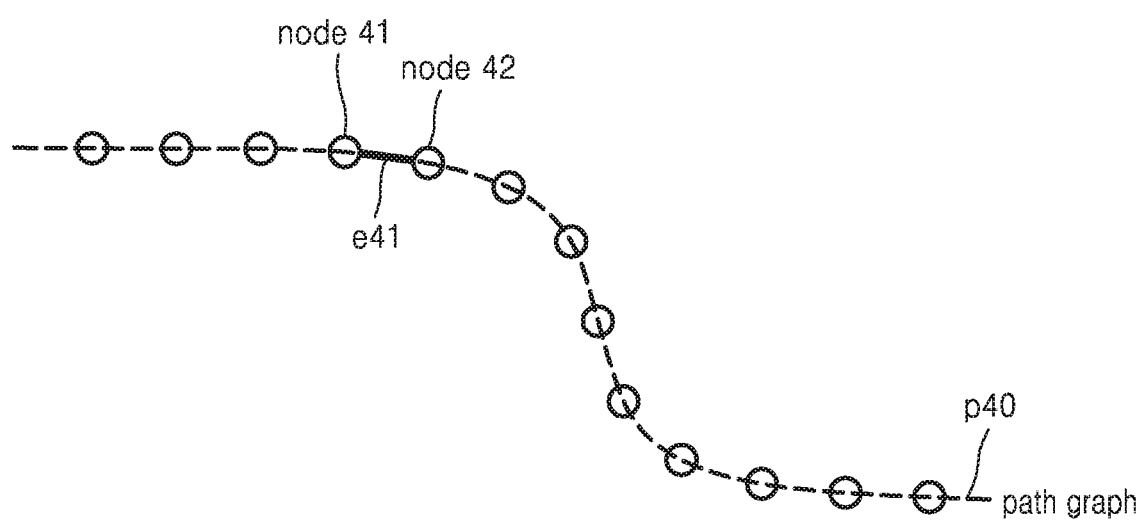
FIG. 4 is a diagram for describing an example of generating an edge between nodes, according to an embodiment.
Figure 5:
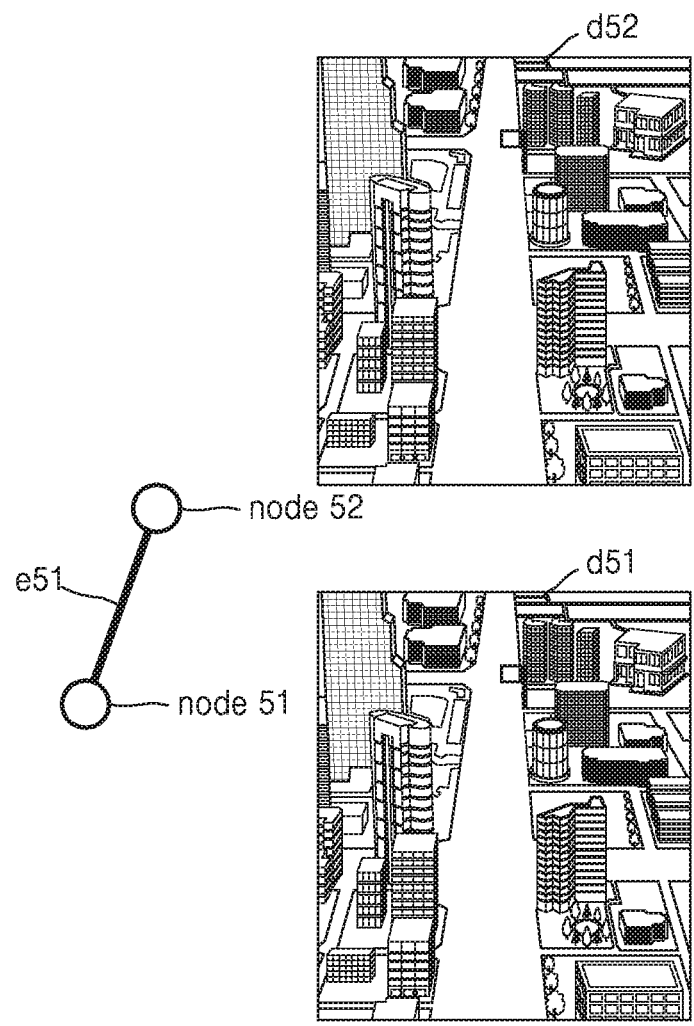
FIG. 5 is a diagram for describing an example of generating an edge between nodes by using image data, according to an embodiment.

FIG. 3 is a flowchart of an example of generating an edge between nodes, according to an embodiment. FIG. 4 is a diagram for describing an example of generating an edge between nodes, according to an embodiment. FIG. 5 is a diagram for describing an example of generating an edge between nodes by using image data, according to an embodiment.

According to an embodiment, generating an edge between two nodes may indicate calculating relative position data between the two nodes and an error value of the relative position data.

Referring to FIG. 4, according to an embodiment, the processor (120 of FIG. 13) may generate a path graph as a set of at least two nodes and edges, each edge between two nodes. A graph may be generated by marking a plurality of nodes as dots and connecting adjacent nodes by means of an edge. For example, a path graph p40 may include an edge e41 connecting a node 41 to a node 42.

In operation S301 of FIG. 3, the processor 120 of the electronic device 100 may calculate relative position data between adjacent nodes and an error value corresponding to the relative position data, by using position data and image data for each node.

According to an embodiment, the electronic device 100 may calculate relative position data between two nodes.

According to an embodiment, the relative position data between two nodes may include a relative distance, a relative angle, and the like between the two nodes. For example, assuming that position data of the node A is (1 m, 2 m, and 3°), and position data of the node B is (2 m, 2 m, and 3.1°), relative position data between the node A and the node B may be (1 m, 0 m, and 0.1°).

According to an embodiment, the electronic device 100 may acquire a changed value (a moved distance, a rotated angle, and the like) of a position of a moving vehicle by using the odometry sensor 230. For example, the odometry sensor 230 may calculate a position change value of a vehicle by measuring the number of revolutions of a wheel or the like while the vehicle is traveling.

According to an embodiment, the electronic device 100 may calculate an error value corresponding to relative position data of two nodes.

According to an embodiment, an error value of an edge between two nodes may be calculated as an error covariance. For example, when relative position data between two nodes is represented as 3DoF, an error value of the relative position data may be calculated as a 3-by-3 matrix. In addition, when relative position data between two nodes is represented as 6DoF, an error value of the relative position data may be calculated as a 6-by-6 matrix.

According to an embodiment, the electronic device 100 may calculate relative position data of two nodes and an error value of the relative position data, by scan-matching image data (e.g., 3D point cloud) of the two nodes.

As shown in FIG. 5, the electronic device 100 may calculate an error value by scan-matching image data d51 acquired at a node 51 and image data d52 acquired at a node 52 and performing image data comparison.

For example, the electronic device 100 may generate edges between consecutive nodes by scan-matching image data corresponding to the consecutive nodes while the vehicle (1 of FIG. 1) is traveling.

In addition, for example, when the vehicle (1 of FIG. 1) repetitively passes by similar points while traveling, image data at a first node and image data at a second node at a second passing time point may be scan-matched to generate an edge between nodes indicating adjacent points.

In operation S302 of FIG. 3, the processor 120 of the electronic device 100 may correct position data for each node such that an error value is minimized.

According to an embodiment, the processor 120 may correct position data for each node such that an error value is minimized, based on an error value corresponding to relative position data between adjacent nodes. The processor 120 may generate a more accurate path graph by correcting a path graph that is a set of nodes based on corrected position data for each node.

Figure 6:
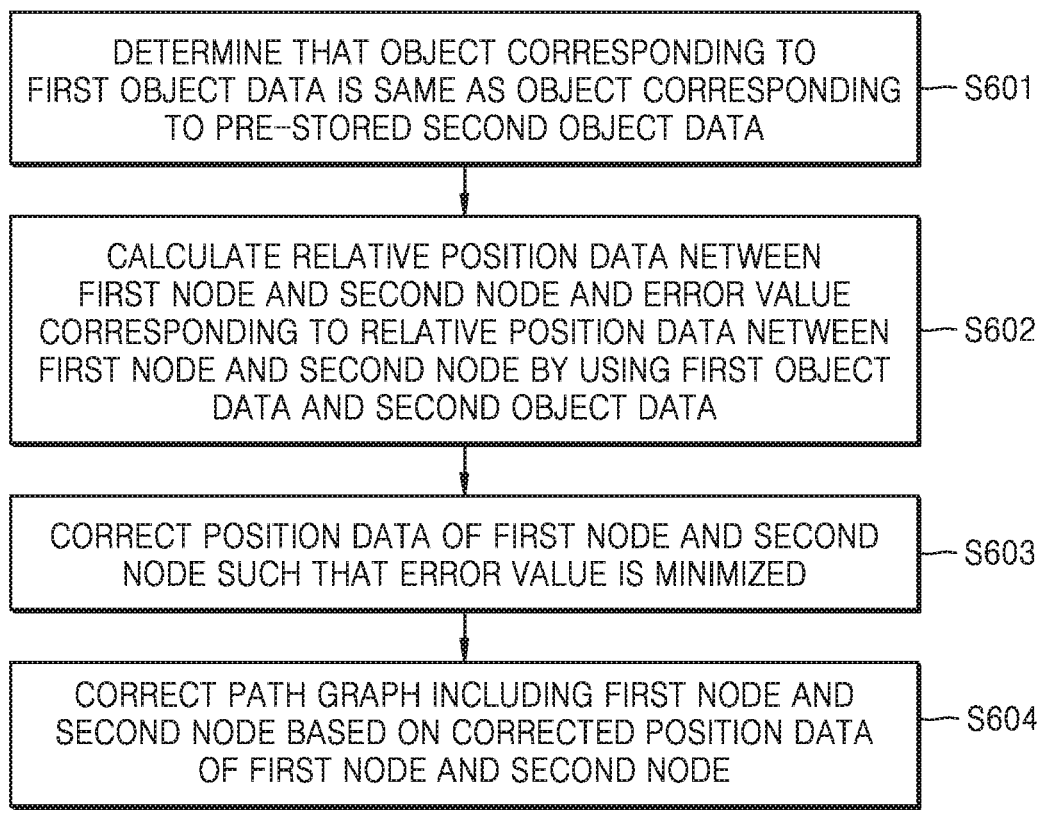
FIG. 6 is a flowchart of an example of generating an edge between nodes by using an object, according to an embodiment.
Figure 7:
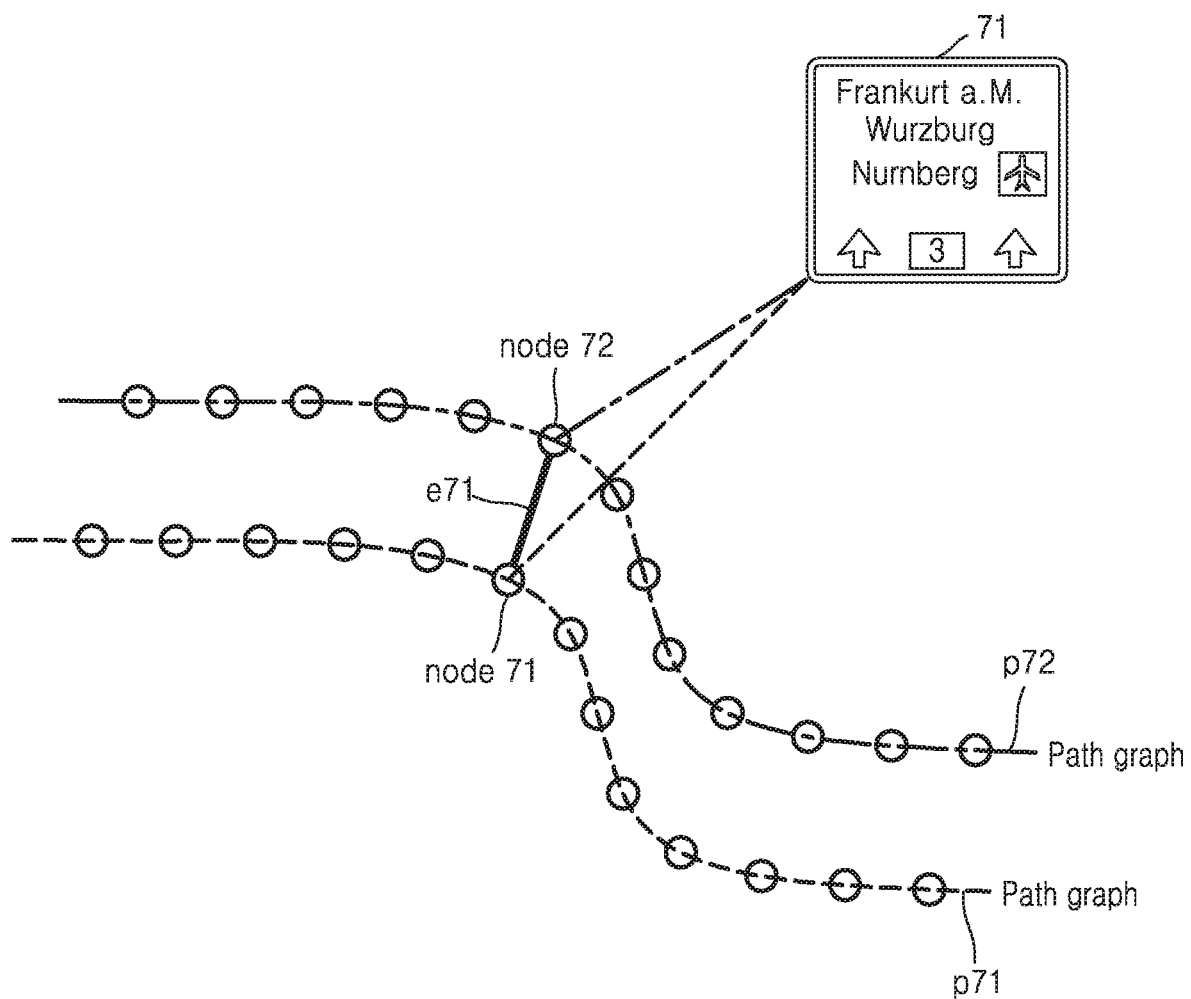
FIGS. 7 and 8 are diagrams for describing examples of generating an edge between nodes by using an object, according to an embodiment.
Figure 8:
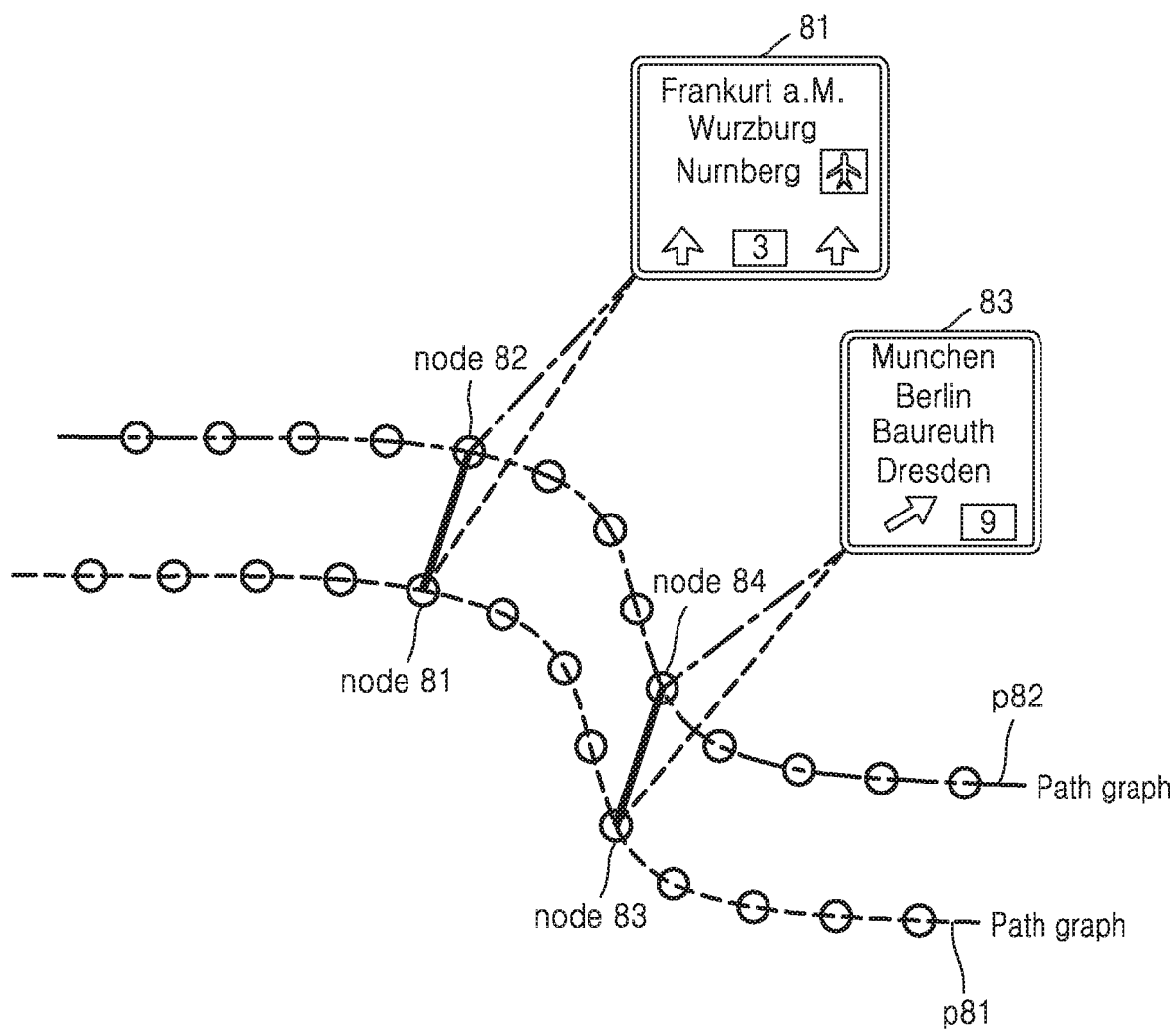

FIG. 6 is a flowchart of an example of generating an edge between nodes by using an object, according to an embodiment. FIGS. 7 and 8 are diagrams for describing examples of generating an edge between nodes by using an object, according to an embodiment.

In operation S601 of FIG. 6, the processor (120 of FIG. 13) of the electronic device 100 may determine that an object corresponding to first object data is the same as an object corresponding to pre-stored second object data.

Referring to FIG. 7, according to an embodiment, while the vehicle (1 of FIG. 1) is traveling, a path graph p71 that is a set of a plurality of nodes according to predetermined time intervals and edges connecting adjacent nodes may be generated.

As shown in FIG. 7, the electronic device 100 may acquire image data around the vehicle (1 of FIG. 1) for each node according to the predetermined time intervals and extract an object 71 from the image data, while the vehicle (1 of FIG. 1) is traveling. The processor 120 of the electronic device 100 may generate object data related to the extracted object 71. For example, the electronic device 100 may generate first object data including a relative distance and a relative angle of the object 71, which have been observed at a node node71, and a size, a figure, and the like of the object 71.

Meanwhile, the electronic device 100 may store second object data of the same object 71. According to an embodiment, when the same object 71 has been observed while the vehicle (1 of FIG. 1) was passing by a similar path to that by which the path graph p71 is generated, the second object data including a figure and a size of the same object 71, a relative distance and a relative angle of the object 71, and the like may be previously generated and stored.

According to an embodiment, the first object data and the second object data may be generated as results of observing the same object at different time points having a predetermined time interval therebetween, respectively.

According to an embodiment, the processor 120 of the electronic device 100 may determine whether object data has been generated according to observation of the same object, by comparing data of a figure, a size, and the like of an object included in the first object data with data of a figure, a size, and the like of an object included in the second object data.

For example, the processor 120 may determine that the same object has been observed at different time points with respect to the first object data and the second object data when similarity between the first object data and the second object data is a preset threshold or more.

In operation S602 of FIG. 6, the processor 120 of the electronic device 100 may calculate relative position data of a first node and a second node and an error value corresponding to the relative position data of the first node and the second node by using the first object data and the second object data.

According to an embodiment, calculating the relative position data of the first node and the second node and the error value corresponding to the relative position data of the first node and the second node may indicate generating an edge between the first node and the second node.

Referring to FIG. 7, according to an embodiment, the electronic device 100 may generate an edge e71 between a first node node71 and a second node node72 by using each object data based on the same object 71 observed for each of the first node node71 and the second node node72 instead of entire image data.

According to an embodiment, the processor 120 may use the first object data corresponding to the first node node71 and the second object data corresponding to the second node node72 to generate the edge e71 between the first node node71 and the second node node72.

For example, the processor 120 may calculate relative position data between the first node node71 and the second node node72 by using, for example, a triangulation method based on the first object data including a relative position between the first node node71 and the object 71 and the second object data including a relative position between the second node node72 and the object 71.

In operation S603 of FIG. 6, the processor 120 of the electronic device 100 may correct position data of the first node and the second node such that the error value is minimized.

According to an embodiment, the processor 120 of the electronic device 100 may correct position data of each node such that a sum of error values of edges constituting a path graph is minimized.

According to an embodiment, the electronic device 100 may use a simultaneous localization and mapping (SLAM) technique of editing a map of a surrounding environment while a moving vehicle or robot is measuring a position thereof. The electronic device 100 may perform loop-closing based on a relative position of two adjacent nodes by using a graph-based SLAM technique. The electronic device 100 may generate a loop-closure edge connecting two nodes by using a relative distance, a relative angle, and the like between the two nodes, thereby deriving a corrected result value.

In operation S604 of FIG. 6, the processor 120 of the electronic device 100 may correct a path graph including the first node and the second node based on the corrected position data of the first node and the second node.

According to an embodiment, the processor 120 may generate a path graph having more accurate position data for each node by correcting a path graph based on corrected position data.

Referring to FIG. 8, according to an embodiment, the electronic device 100 may generate a more accurate path graph by using a plurality of objects observed while the vehicle (1 of FIG. 1) is traveling.

According to an embodiment, the electronic device 100 may detect an object A 81 at a node node81 and detect an object B 83 at a node node83, while the vehicle (1 of FIG. 1) is traveling. In this case, a traveling path of the vehicle (1 of FIG. 1) may be generated as a path graph p81.

Meanwhile, at a different time point, the electronic device 100 may detect the object A 81 at a node node82 and detect the object B 83 at a node node84, while the vehicle (1 of FIG. 1) is traveling. In this case, a traveling path of the vehicle (1 of FIG. 1) may be generated as a path graph p82.

According to an embodiment, the electronic device 100 may store object data of the object A 81 and object data of the object B 83.

According to an embodiment, the processor 120 of the electronic device 100 may correct position data of nodes and generate a highly accurate path graph by using a plurality of pre-stored pieces of object data.

Figure 9:
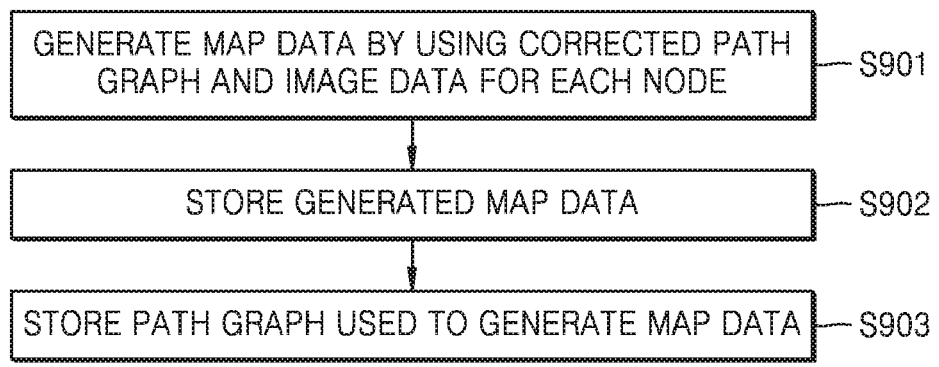
FIG. 9 is a flowchart of an example of generating map data, according to an embodiment.
Figure 10:
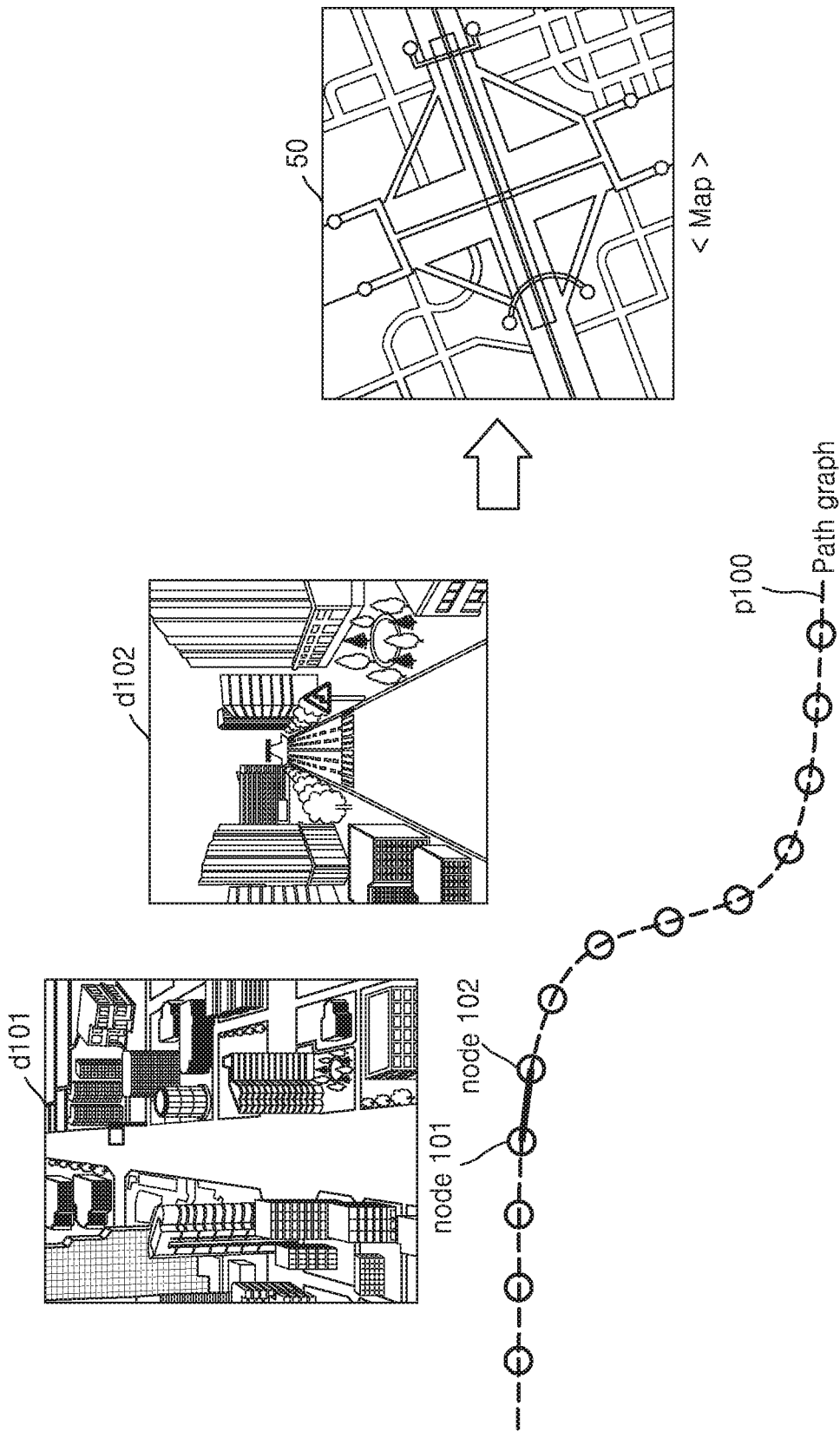
FIG. 10 is a diagram for describing an example of generating map data, according to an embodiment.

FIG. 9 is a flowchart of an example of generating map data, according to an embodiment. FIG. 10 is a diagram for describing an example of generating map data, according to an embodiment.

In operation S901 of FIG. 9, the processor 120 of the electronic device 100 may generate map data by using a corrected path graph and image data for each node.

Referring to FIG. 10, for example, the processor 120 may generate map data 50 including image data d101 corresponding to a node 101 and image data d102 corresponding to a node 102.

According to an embodiment, map data may be implemented in a form of 3D point cloud, 2D grid map, 3D voxel map, or the like but is not limited thereto. In addition, according to an embodiment, map data may be implemented in various forms (e.g., feature map, semantic map, dense map, texture map, and the like) according to types of data included in a map when the map is generated.

For example, the processor 120 may generate map data of a 3D point cloud form by using image data of the 3D point cloud form, which corresponds to each node, based on position data of each node in a corrected path graph. Alternatively, the processor 120 may generate map data by converting the image data of the 3D point cloud form, which corresponds to each node, into a 3D voxel form. Alternatively, the processor 120 may generate map data of a 2D grid form by using only a road surface extracted from the image data of the point cloud form or an image form, which corresponds to each node.

In operation S902 of FIG. 9, the processor (120 of FIG. 13) of the electronic device 100 may store the generated map data. In operation S903 of FIG. 9, the processor 120 of the electronic device 100 may store a path graph used when the map data was generated.

In addition, as described with reference to FIG. 2, according to an embodiment, the electronic device 100 may store object data corresponding to a node at which an object has been observed.

According to an embodiment, the processor 120 may store a path graph and object data and extend the path graph by adding node-based position data and object data acquired while the vehicle (1 of FIG. 1) is traveling in the future.

According to an embodiment, the processor 120 may correct the pre-stored path graph by using additionally acquired node-based position data and object data based on the pre-stored path graph, thereby updating the pre-stored path graph to a path graph having more precise position data. Furthermore, the processor 120 may update the map data to more precise map data based on the more precise position data.

Meanwhile, the electronic device 100 may delete image data for each node, which has been used to generate the map data, after generating the map data. According to an embodiment, the electronic device 100 may delete image data for each node, which has been used to generate map data after the map data is generated, because object data and a path graph including pre-stored node-based position data are used to update map data.

According to an embodiment, it is described throughout the specification that the electronic device 100 performs operations, but the present embodiment is not limited thereto. The electronic device 100 may perform all operations, or a server (not shown) may perform some operations of the electronic device 100.

According to an embodiment, the electronic device 100 may store or process data by being linked to the server (not shown). According to an embodiment, the electronic device 100 may transmit acquired data to the server (not shown), and the server may process the data. For example, the electronic device 100 may transmit acquired position data of the electronic device 100, image data, and object data to the server, and the server may generate and correct a path graph by using the position data of the electronic device 100, the image data, and the object data and generate and update map data, but the present embodiment is not limited thereto.

Figure 11:
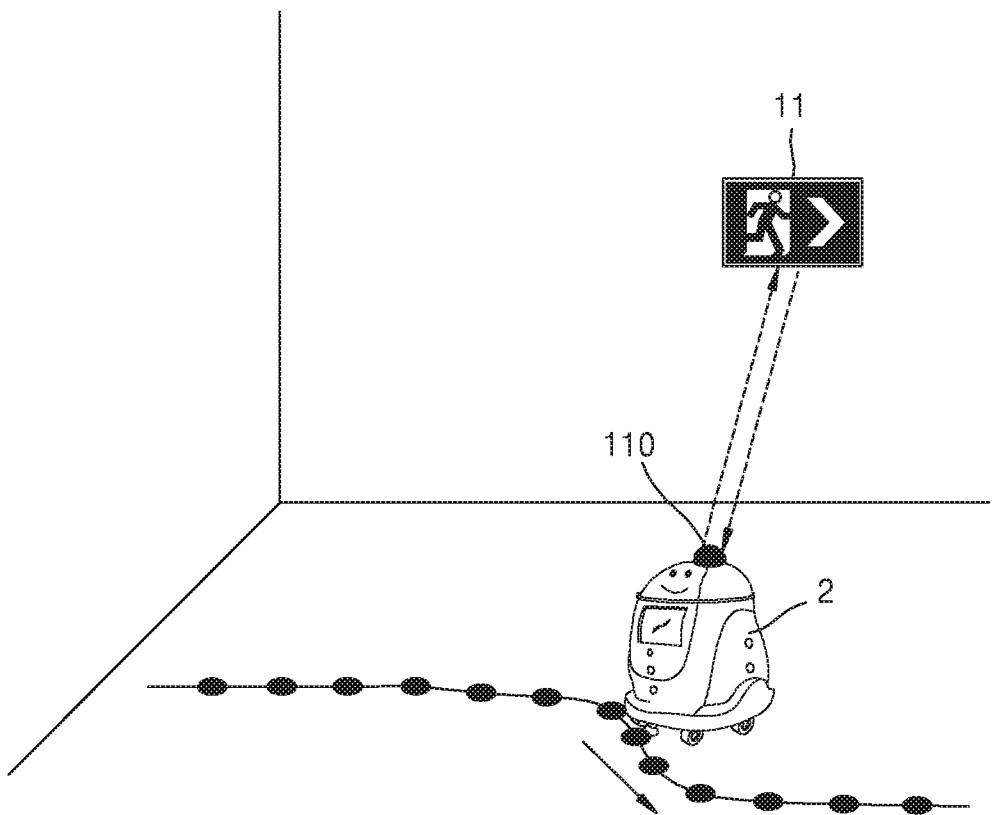
FIG. 11 is a diagram for describing an example of an electronic device operating indoors, according to an embodiment.

FIG. 11 is a diagram for describing an example of an electronic device operating indoors, according to an embodiment.

According to an embodiment, a movable robot 2 may include the electronic device 100.

For example, robots for providing various kinds of services in a shopping mall, an airport, a hospital, a factory, a house, and the like, a robot for detecting a dangerous situation, and the like may include the electronic device 100.

For example, the robot 2 including the electronic device 100 may acquire position data and image data for each of a plurality of nodes according to a predetermined time interval or distance interval by using the sensing unit 110 while the robot 2 is moving indoors. The electronic device 100 may extract an object from the image data.

According to an embodiment, the object may be a matter having a low possibility of a change in a position, a figure, a size, and the like of the matter over time among matters which the robot 2 can observe in the surroundings. For example, the object may be an exit sign, a guidance text, a tag (a near-field communication (NFC) tag, a radio frequency identification (RFID) tag, or the like), a hydrant, a poster, a room number, a guidance sign board, an escalator, an elevator, steps, a sensor (sensor for sensing a temperature, humidity, air quality, atmospheric pressure, or the like), a closed-circuit television (CCTV), a pillar, a ceiling, a floor, a wall, glass, or the like but is not limited thereto.

As shown in FIG. 11, according to an embodiment, the robot 2 including the electronic device 100 may sense an exit sign 11 while moving indoors.

According to an embodiment, the electronic device 100 may generate object data (e.g., a size, a figure, and a material of the exit sign 11, text information recognized from a guidance sign board, distance data between the electronic device 100 which has sensed the exit sign 11 and the exit sign 11, and the like) for identifying the exit sign 11.

According to an embodiment, the electronic device 100 may correct a path graph and update map data by using the object data.

Figure 12:
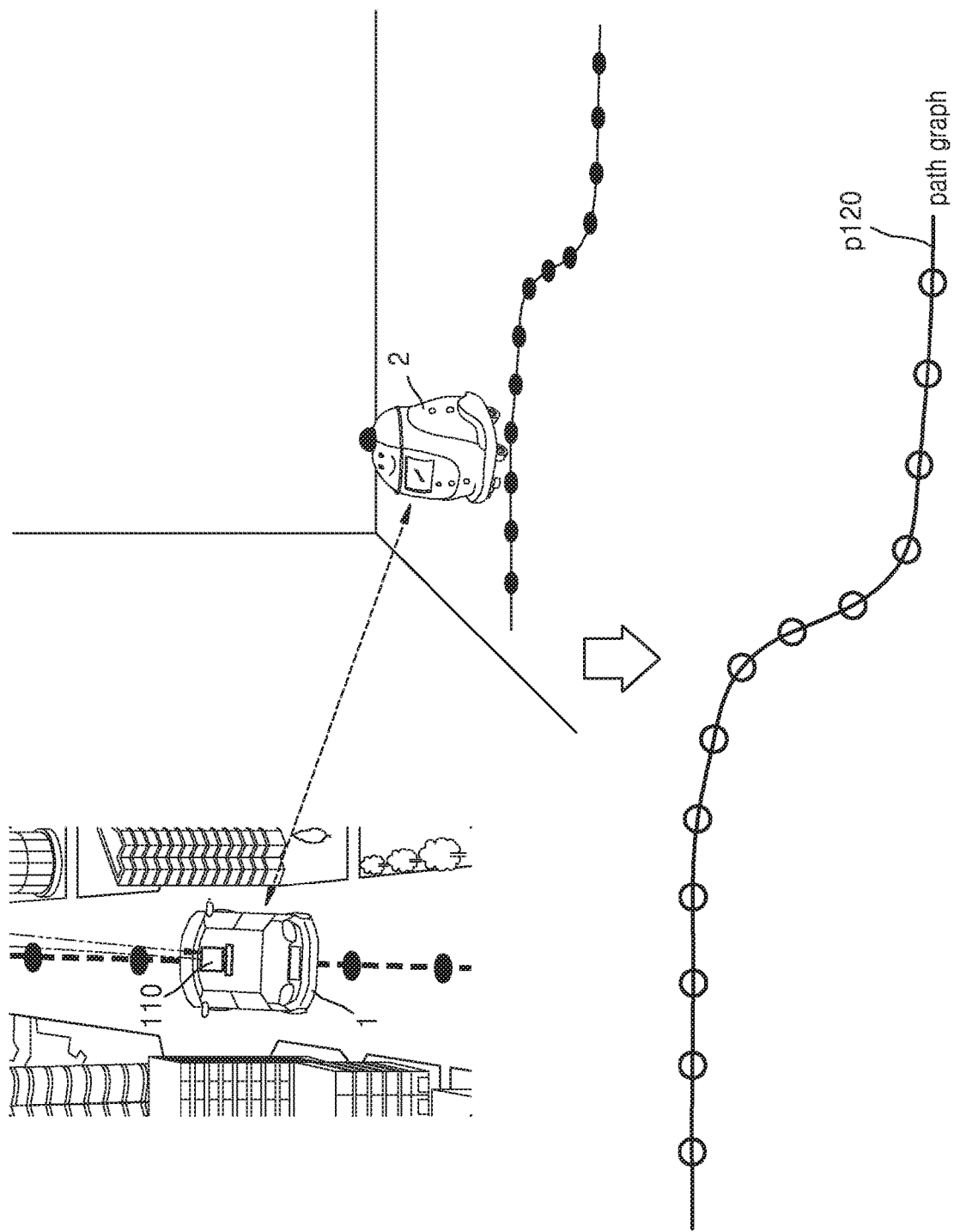
FIG. 12 is a diagram for describing an example of data link between a plurality of electronic devices, according to an embodiment.

FIG. 12 is a diagram for describing an example of data link between a plurality of electronic devices, according to an embodiment.

According to an embodiment, the electronic device 100 included in the vehicle 1 may operate by being linked to the electronic device 100 operating and included in the robot 2. In addition, according to an embodiment, the electronic device 100 included in the vehicle 1 may operate by being linked to an electronic device included in another vehicle. In addition, the electronic device 100 included in the robot 2 may operate by being linked to an electronic device included in another robot.

As shown in FIG. 12, the vehicle 1 traveling on the road may operate by being linked to the robot 2 moving inside a building. For example, position data and image data acquired while the vehicle 1 is moving on the road and position data and image data acquired while the robot 2 is moving indoors may be combined to generate a path graph p120 and map data.

According to an embodiment, regardless of indoors or outdoors, position data, image data, and object data acquired by the vehicle 1 or the robot 2 including the electronic device 100 may be used to update map data.

According to an embodiment, each of a plurality of electronic devices 100 may perform the operations of the electronic device 100 described with reference to FIGS. 1 to 11. Data acquired by the plurality of electronic devices 100 may be shared with other linkable and operable electronic devices.

In addition, according to an embodiment, at least one of a plurality of electronic devices linked to each other may receive data from the other electronic devices and store and process the received data.

In addition, according to an embodiment, a server (not shown) may collect data acquired by a plurality of electronic devices and store and process the data, but the present embodiment is not limited thereto.

FIG. 13 is a block diagram of an electronic device according to an embodiment.

According to an embodiment, the electronic device 100 may include the sensing unit 110 and the processor 120. The electronic device 100 shown in FIG. 13 includes only components related to the present embodiment. Therefore, it could be understood by those of ordinary skill in the art to which the present embodiment belongs that general-use components other than the components shown in FIG. 13 may be further included.

According to an embodiment, the sensing unit 110 may acquire a surrounding image including objects located around the vehicle (1 of FIG. 1), which is traveling on the road.

The sensing unit 110 may include a plurality of sensors to acquire the surrounding image. For example, the sensing unit 110 may include a distance sensor such as a LIDAR sensor and radio detection and ranging (RADAR) sensor and an image sensor such as a camera.

In addition, the sensing unit 110 may include one or more actuators configured to correct positions and/or orientations of a plurality of sensors and may thus sense objects located in front, rear, and side directions of the vehicle (1 of FIG. 1).

In addition, the sensing unit 110 may sense a shape of an object located in the surroundings, a shape of a lane, and the like by using an image sensor. According to an embodiment, the processor 120 may include at least one processor.

According to an embodiment, the processor 120 may extract an object from image data and generate first object data including a figure of the extracted object.

The processor 120 may store location data of a first node corresponding to the image data from which the object has been extracted and the first object data in the storage unit 140.

In addition, when it is determined that the object corresponding to the first object data is the same as an object corresponding to pre-stored second object data, the processor 120 may be further configured to calculate relative position data of the first node and a second node corresponding to the second object data and an error value corresponding to the relative position data by using the first object data and the second object data. In addition, the processor 120 may correct position data of the first node and the second node such that the error value is minimized.

In addition, the processor 120 may correct a path graph including the first node and the second node based on the corrected position data of the first node and the second node In addition, the processor 120 may calculate relative position data between adjacent nodes and an error value corresponding to the relative position data by using node-based position data and image data, and correct the position data for each node such that the error value is minimized.

In addition, the processor 120 may generate a path graph including the position data for each node, the relative position data between adjacent nodes, and the error value corresponding to the relative position data.

In addition, the processor 120 may correct the path graph based on the correct position data for each node. In addition, the processor 120 may generate map data by using the corrected path graph and the image data for each node and store the generated map data. In addition, the processor 120 may store the path graph used to generate the map data after generating the map data. In addition, the processor 120 may delete the image data for each node, used to generate the map data.

In addition, the processor 120 may extend the path graph by using position data acquired while the vehicle (1 of FIG. 1) is traveling after storing the path graph.

Figure 14:
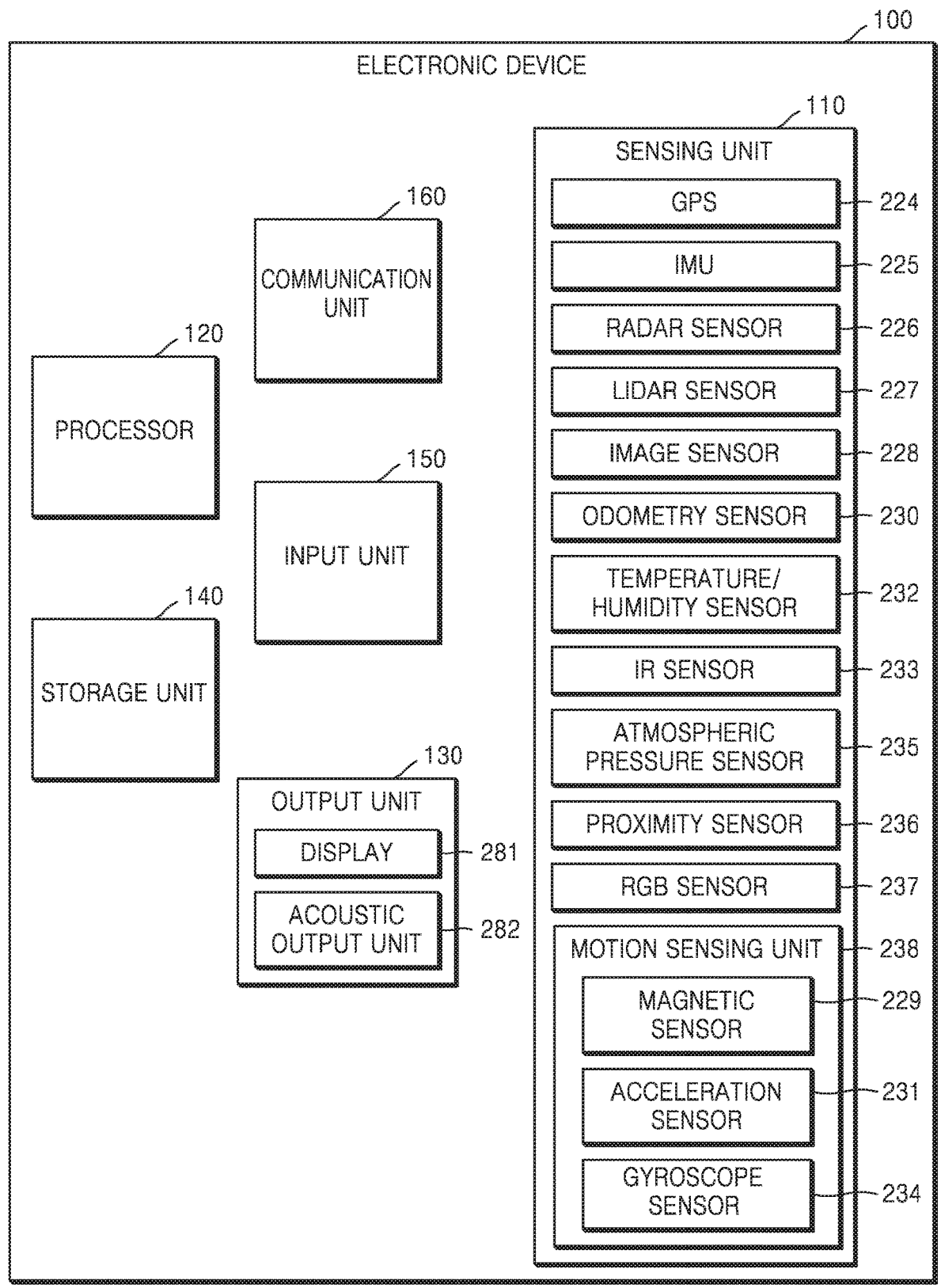
FIG. 14 is a block diagram of an electronic device according to another embodiment.

FIG. 14 is a block diagram of an electronic device according to another embodiment.

The electronic device may include the sensing unit 110, the processor 120, an output unit 130, a storage unit 140, an input unit 150, and a communication unit 160.

The sensing unit 110 may include a plurality of sensors configured to detect information regarding a surrounding environment where the vehicle (1 of FIG. 1) is located and include one or more actuators configured to correct positions and/or orientations of the sensors. For example, the sensing unit 110 may include the GPS 224, the IMU 225, a RADAR sensor 226, the LIDAR sensor 227, the image sensor 228, and the odometry sensor 230. In addition, the sensing unit 110 may include at least one of a temperature/humidity sensor 232, an infrared sensor 233, an atmospheric pressure sensor 235, a proximity sensor 236, and an RGB (illuminance) sensor 237 but is not limited thereto. A function of each sensor may be intuitively inferred by those of ordinary skill in the art from a name thereof, and thus a detailed description thereof is omitted herein.

In addition, the sensing unit 110 may include a motion sensing unit 238 capable of sensing a motion of the vehicle (1 of FIG. 1). The motion sensing unit 238 may include a magnetic sensor 229, the acceleration sensor 231, and a gyroscope sensor 234.

The GPS 224 may be configured to estimate a geographical position of the vehicle (1 of FIG. 1). That is, the GPS 224 may include a transceiver configured to estimate a position of the vehicle (1 of FIG. 1) on the Earth.

The IMU 225 may be a set of sensors configured to detect changes in a position and an orientation of the vehicle (1 of FIG. 1) based on an inertial acceleration. For example, the set of sensors may include accelerometers and gyroscopes.

The RADAR sensor 226 may be configured to detect objects in an environment where the vehicle (1 of FIG. 1) is located, by using a radio signal. In addition, the RADAR sensor 226 may be configured to detect speeds and/or directions of the objects.

The LIDAR sensor 227 may be configured to detect objects in an environment where the vehicle (1 of FIG. 1) is located, by using a laser. More particularly, the LIDAR sensor 227 may include a laser light source and/or a laser scanner configured to emit a laser beam and a detector configured to detect reflection of the laser beam. The LIDAR sensor 227 may be configured to operate in a coherent (e.g., using heterodyne detection) or incoherent detection mode.

The image sensor 228 may be a still camera or a video camera configured to record an environment outside the vehicle (1 of FIG. 1). For example, the image sensor 228 may include a plurality of cameras, and the plurality of cameras may be arranged at a plurality of positions inside and outside the vehicle (1 of FIG. 1).

The odometry sensor 230 may estimate a position of the vehicle (1 of FIG. 1) and measure a moved distance of the vehicle (1 of FIG. 1). For example, the odometry sensor 230 may measure a position change value of the vehicle (1 of FIG. 1) by using the number of revolutions of a wheel of the vehicle (1 of FIG. 1).

In addition, a position of the electronic device 100 may be measured in a method such as trilateration, triangulation, or the like by using sensor and communication means such as third generation (3G), long term evolution (LTE), global navigation satellite system (GNSS), global system for mobile communication (GSM), long range navigation revision C (LORAN-C), northwest European LORAN-C system (NELS), wireless local area network (WLAN), Bluetooth, or the like.

In addition, when the electronic device 100 is located indoors, a position of the electronic device 100 may be measured by using a sensor such as an indoor-GPS, a Bluetooth sensor, a WLAN, a video local area network client (VLC), an active badge, a GSM sensor, an RFID sensor, visual tags, a wireless intrusion protection system (WIPS), a WLAN, an ultrasonic sensor, a magnetic sensor, or the like.

According to an embodiment, a method of measuring a position of the electronic device 100 is not limited to the examples described above, and another method capable of acquiring position data of the electronic device 100 may be surely applied.

The storage unit 140 may include a magnetic disc drive, an optical disc drive, and a flash memory. Alternatively, the storage unit 140 may be a portable universal serial bus (USB) data storage device. The storage unit 140 may store system software for executing examples related to the present application. The system software for executing examples related to the present application may be stored in a portable storage medium.

The communication unit 160 may include at least one antenna for communicating with another device in a wireless manner. For example, the communication unit 160 may be used to communicate with a cellular network or another wireless protocol and system in a wireless manner through Wi-Fi or Bluetooth. The communication unit 160 controlled by the processor 120 may transmit and receive a wireless signal. For example, the processor 120 may execute a program stored in the storage unit 140, such that the communication unit 160 transmits and receives a wireless signal to and from a cellular network.

The input unit 150 indicates a means for inputting data for controlling the vehicle (1 of FIG. 1). For example, the input unit 150 may include a key pad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto. In addition, the input unit 150 may include a microphone, wherein the microphone may be configured to receive audio (e.g., a voice command) from a passenger of the vehicle (1 of FIG. 1).

The output unit 130 may output an audio signal or a video signal, and the output unit 130 may include a display 281 and an acoustic output unit 282.

The display 281 may include at least one of a liquid crystal display, a thin film transistor-liquid crystal display, an organic light-emitting diode display, a flexible display, a 3D display, and an electrophoretic display. According to an implementation form of the output unit 130, the output unit 130 may include two or more displays 281.

The acoustic output unit 282 outputs audio data received from the communication unit 160 or stored in the storage unit 140. In addition, the acoustic output unit 282 may include a speaker, a buzzer, and the like.

The input unit 150 and the output unit 130 may include a network interface and may be implemented by a touch screen.

The processor 120 may generally control the sensing unit 110, the communication unit 160, the input unit 150, the storage unit 140, and the output unit 130 by executing programs stored in the storage unit 140.

Figure 15:
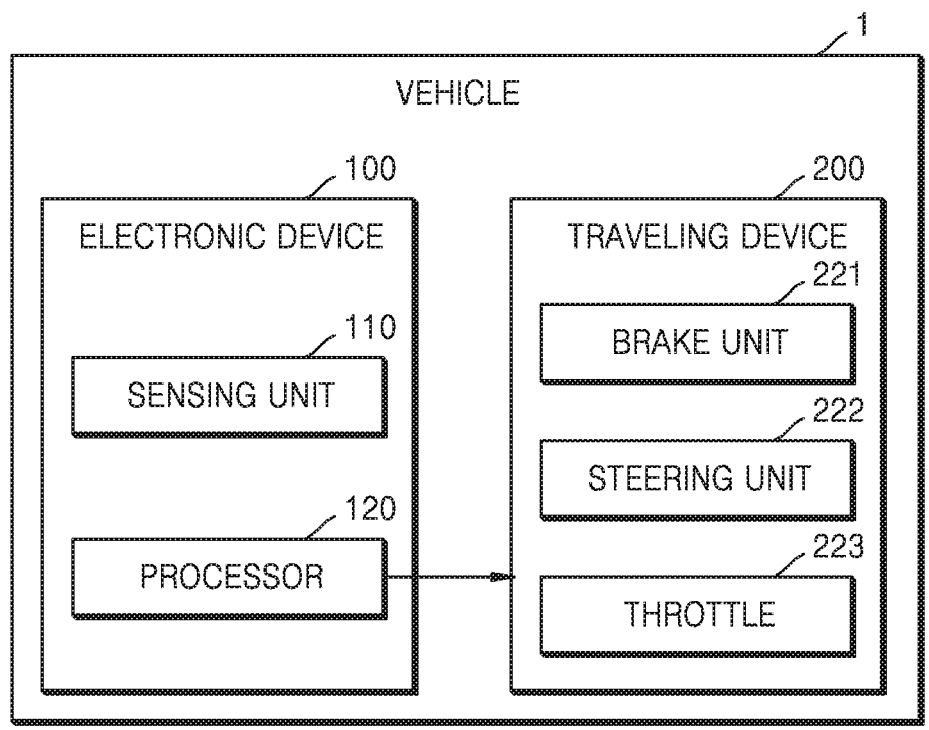
FIG. 15 is a block diagram of a vehicle according to an embodiment.

FIG. 15 is a block diagram of a vehicle according to an embodiment.

The vehicle 1 may include the electronic device 100 and a traveling device 200 according to embodiments. The vehicle 1 shown in FIG. 15 includes only components related to the present embodiment. Therefore, it could be understood by those of ordinary skill in the art to which the present embodiment belongs that general-use components other than the components shown in FIG. 15 may be further included.

The electronic device 100 may include the sensing unit 110 and the processor 120.

A description of the sensing unit 110 and the processor 120 has been made above with reference to FIGS. 11 and 12, and thus the description thereof is omitted herein.

The traveling device 200 may include a brake unit 221, a steering unit 222, and a throttle 223.

The steering unit 222 may be a set of mechanisms configured to adjust a direction of the vehicle 1.

The throttle 223 may be a set of mechanisms configured to control a speed of the vehicle 1 by controlling an operating speed of an engine/motor. In addition, the throttle 223 may adjust a throttle open rate to adjust a mixed gas volume of fuel air flowing in the engine/motor and may adjust a throttle open rate to adjust motive power and thrust.

The brake unit 221 may be a set of mechanisms configured to decelerate the vehicle 1. For example, the brake unit 221 may use friction to reduce a speed of a wheel/tire.

A device according to the present embodiments described above may include a processor, a memory for storing and executing program data, a permanent storage such as a disc drive, a communication port for communicating with an external device, a user interface device such as a touch panel, a key, a button, and the like, and the like. Methods implemented by a software module or algorithm may be stored in a computer-readable recording medium as computer-readable code or program commands executable in the processor. Herein, examples of the computer-readable recording medium include magnetic storage media (e.g., read-only memory (ROM), random-access memory (RAM), floppy disks, hard disks, etc.) and optical recording media (e.g., CD-ROMs, or digital versatile discs (DVDs)), and the like. The computer-readable recording medium can also be distributed over network-coupled computer systems so that the computer-readable code is stored and executed in a distributed fashion. The medium is readable by a computer, is stored in a memory, and can be executed by a processor.

The present embodiments can be represented with functional blocks and various processing steps. These functional blocks can be implemented by various numbers of hardware and/or software configurations for executing specific functions. For example, the embodiments may adopt direct circuit configurations, such as memory, processing, logic, and look-up table, for executing various functions under control of one or more processors or by other control devices. Like components of the present embodiments being able to execute the various functions with software programming or software elements, the present embodiments can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present embodiments may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

The invention claimed is:

1. An electronic device comprising:
   at least one sensing unit configured to acquire position data and image data for each of a plurality of nodes at predetermined intervals while the electronic device is moving; and
   a processor configured to:
     extract an object from the image data,
     generate first object data for identifying the extracted object, and
     store position data of a first node corresponding to the image data from which the object has been extracted and the first object data corresponding to the first node,
   wherein when it is determined that the object corresponding to the first object data is the same as an object corresponding to pre-stored second object data, the processor is further configured to:
     calculate relative position data between the first node and a second node corresponding to the pre-stored second object data and an error value corresponding to the relative position data between the first node and the second node by using the first object data and the pre-stored second object data, and
     correct the position data of the first node and the second node such that the error value is minimized.

2. The electronic device of claim 1, wherein the processor is further configured to:
   correct a path graph including the first node and the second node, based on the corrected position data of the first node and the second node.

3. The electronic device of claim 1, wherein the processor is further configured to:
   calculate relative position data between adjacent nodes and an error value corresponding to the relative position data by using the position data and the image data for each of the plurality of nodes, and
   correct the position data for each of the plurality of nodes such that the error value is minimized.

4. The electronic device of claim 3, wherein the processor is further configured to:
   generate a path graph including the position data for each of the plurality of nodes, the relative position data between adjacent nodes, and the error value corresponding to the relative position data.

5. The electronic device of claim 4, wherein the processor is further configured to:
   correct the path graph based on the corrected position data for each of the plurality of nodes.

6. The electronic device of claim 5, wherein the processor is further configured to:
   generate map data by using the corrected path graph and the image data for each of the plurality of nodes, and
   store the generated map data.

7. The electronic device of claim 6, wherein the processor is further configured to:
   store the path graph used to generate the map data after generating the map data, and
   delete the image data for each of the plurality of nodes, which has been used to generate the map data.

8. The electronic device of claim 7, wherein the processor is further configured to:
   extend the path graph by using the position data acquired while the electronic device is moving after storing the path graph.

9. The electronic device of claim 1, wherein the first object data comprises:
   at least one of a size and a color of the object, distance data indicating a distance between the first node and the object, or direction data indicating a direction of the object with respect to the first node.

10. An operating method of an electronic device, the operating method comprising:
    acquiring position data and image data for each of a plurality of nodes at predetermined intervals while the electronic device is moving;
    extracting an object from the image data;
    generating first object data for identifying the extracted object;
    storing position data of a first node corresponding to the image data from which the object has been extracted and the first object data corresponding to the first node;
    determining that the object corresponding to the first object data is the same as an object corresponding to pre-stored second object data;
    calculating relative position data between the first node and a second node corresponding to the pre-stored second object data and an error value corresponding to the relative position data between the first node and the second node by using the first object data and the pre-stored second object data; and
    correcting the position data of the first node and the second node such that the error value is minimized.

11. The operating method of claim 10, further comprising:
    correcting a path graph including the first node and the second node based on the corrected position data of the first node and the second node.

12. The operating method of claim 10, further comprising:
    calculating relative position data between adjacent nodes and an error value corresponding to the relative position data by using the position data and the image data for each of the plurality of nodes; and
    correcting the position data for each of the plurality of nodes such that the error value is minimized.

13. The operating method of claim 12, further comprising:
generating a path graph including the position data for each of the plurality of nodes, the relative position data between adjacent nodes, and the error value corresponding to the relative position data.

14. The operating method of claim 13, further comprising:
correcting the path graph based on the corrected position data for each of the plurality of nodes.

15. The operating method of claim 14, further comprising:
generating map data by using the corrected path graph and the image data for each of the plurality of nodes; and
storing the generated map data.

16. The operating method of claim 15, further comprising:
storing the path graph used to generate the map data after the map data is generated; and
deleting the image data for each of the plurality of nodes, which has been used to generate the map data.

17. The operating method of claim 10, wherein the first object data comprises:
at least one of a size and a color of the object, distance data indicating a distance between the first node and the object, or direction data indicating a direction of the object with respect to the first node.

18. A non-transitory, computer-readable recording medium having recorded thereon a program for executing, on a computer, the operating method of claim 10.

* * * * *